(12) United States Patent
Shimizu

(10) Patent No.: US 6,535,981 B1
(45) Date of Patent: Mar. 18, 2003

(54) INFORMATION PROCESSING SYSTEM

(75) Inventor: Yusuke Shimizu, Tokyo (JP)

(73) Assignee: Sega Enterprises. Ltd., Tokyo (JP)

( * ) Notice: Subject to any disclaimer, the term of this patent is extended or adjusted under 35 U.S.C. 154(b) by 0 days.

(21) Appl. No.: 09/128,199

(22) Filed: Aug. 3, 1998

(30) Foreign Application Priority Data

Aug. 4, 1997  (JP) ............................................. 9-209350

(51) Int. Cl.$^7$ ............................................... G06F 11/30
(52) U.S. Cl. ........................ 713/200; 705/51; 235/375
(58) Field of Search ........................... 713/200; 705/51, 705/57, 58, 59; 235/380, 454, 375

(56) References Cited

U.S. PATENT DOCUMENTS

| | | | | |
|---|---|---|---|---|
| 5,371,792 A | * | 12/1994 | Asai et al. ...................... | 380/3 |
| 5,461,220 A | * | 10/1995 | Ogino ......................... | 235/454 |
| 5,668,945 A | * | 9/1997 | Ohba et al. .................. | 713/200 |
| 5,912,969 A | * | 6/1999 | Sasamoto ..................... | 705/57 |
| 5,974,140 A | * | 10/1999 | Tanaka ......................... | 705/52 |
| 6,226,747 B1 | * | 5/2001 | Larsson et al. ................ | 360/60 |
| 6,278,984 B1 | * | 8/2001 | Itami et al. .................... | 705/51 |
| 6,301,569 B1 | * | 10/2001 | Oshima ........................ | 705/57 |

FOREIGN PATENT DOCUMENTS

| | | | |
|---|---|---|---|
| JP | 3-105525 | | 5/1991 |
| JP | 404234291 | * | 8/1992 |
| JP | 7-287655 | | 10/1995 |
| JP | 408022388 | * | 1/1996 |
| JP | 010201929 | * | 4/1998 |

* cited by examiner

*Primary Examiner*—John F. Niebling
*Assistant Examiner*—Stacy Whitmore
(74) *Attorney, Agent, or Firm*—Keating & Bennett, LLP

(57) ABSTRACT

The information processing system of the present invention is composed of a recording medium 2 and an information processing device 1. The recording medium 2 comprises a first recording region 21 and a second recording region 22. The information processing device 1 either regenerates data recorded in the first recording region 21 of the recording medium 2 or executes a program recorded in the first recording region 21 of the recording medium 2, and comprises recording means for recording specific information of its own into the second recording region 22 of the above-mentioned recording medium 2. The information processing device 1 comprises comparing means 101 for comparing specific information recorded from the recording means with specific information in the second recording region, and processing means 101 for changing the operation of regenerating data of the recording medium or the operation of executing a program in the recording medium 2 in accordance with the result of the comparison.

19 Claims, 3 Drawing Sheets

INFORMATION PROCESSING SYSTEM

BACKGROUND OF THE INVENTION

1. Field of the Invention

The present invention relates to an information processing system, an information processing device used in this system and a recording medium used in this system. More particularly, this invention relates to an information processing system, an information processing device and a medium, which are designed to make the operational environment of a recording medium used only for a specific information processing device (for example, a game device owned by a user) different from that of a recording medium already used by another information processing device (for example, a game device other than that owned by a user).

2. Description of the Related Art

Conventionally, an information processing system has been suggested, which is designed to perform specified information processing operations on the basis of whether or not ID information of an information processing device is identical with ID information of a recording medium by setting a region where a specific identification number (mainly ID information) can be memorized in a recording medium such as a ROM cassette or CD-ROM. The related art is disclosed in Japanese Patent Laid-Open (Kokai) Publication No. Sho 5 (1930)-52967, Japanese Patent Laid-Open (Kokai) Publication No. Sho 9 (1934)-34799, Japanese Patent Laid-Open (Kokai) Publication No. Sho 9 (1934)-26875, and the like.

These prior art documents suggested countermeasures against the illegal use of software by comparing the identification number of an information processing device with the identification number of an information processing device stored in a recording medium, and if the numbers are not the same, they prevent illegal installation of a program stored in the recording medium to an HDD of the information processing device.

These above-mentioned prior art documents, however, prevent only the illegal installation of a program stored in a recording medium into an information processing device. No attention is paid to an information processing system used without installation of the program stored in a recording medium into an HDD of the device, for example, a system composed of a recording medium with a game program stored therein and a game device.

SUMMARY OF THE INVENTION

It is an object of this invention to provide an information processing system of the kind described above with varied information processing operational environment by differing the operational environment of a recording medium used solely for a specific information processing device (for example, a game device owned by an user) and the operational environment of a recording medium already used by another information processing device.

It is another object of this invention to provide an information processing system designed to enhance the value of a recording medium used solely for a specific information processing device by differing the operational environment thereof and the operational environment of a recording medium already used by another information processing device.

It is still another object of this invention to provide an information processing device used in the above-described information processing system, and a recording medium. Moreover, it is a further object of this invention to provide a game machine relating to this information processing system, and a recording medium for a game machine.

In order to achieve the above-mentioned objects, the information processing system according to this invention comprises a recording medium and an information processing device. The recording medium comprises a first recording region and a second recording region. The information processing device either produces data recorded in the first recording region of the recording medium or executes a program recorded in the first recording region of the recording medium, and comprises recording means for recording it specific information into the second recording region of the recording medium. The information processing device further comprises comparing means for comparing specific information recorded from the recording means with specific information in the second recording region, and processing means for changing the operation of regenerating data in the recording medium or the operation of executing a program in the recording medium in accordance with the result of the comparison.

This invention makes it possible to provide an information processing system that enhances the value of a recording medium used solely for a specific information processing device (for example, a game device owned by a user) by differing the operational environment of the recording medium and the operational environment of a recording medium already used by another information processing device (for example, a game device other than the game device owned by a user).

At the same time, with the information processing system of this invention, if the specific information do not coincide with each other as a result of the comparison made by the comparing means, the processing means will limit the replaying operation of data recorded in the first recording region of the recording medium, or will limit the executing operation of a program.

It is preferable that the specific information be identification information of the information processing device. In this case, if the identification information of the information processing device is identical with the identification information of the recording medium it is determined that the recording medium has not been used by another information processing device. On the other hand, if the identification information is not the same, it is determined that the recording medium has already been used by another information processing device. In accordance with the result of these above-described determinations, the operation of regenerating data of the recording medium or the operation of executing a program will be changed.

The recording medium is, for example, a medium with a game program stored therein, and the information processing device is a game device. In this case, the processing means will change the operation of processing the game, the progress of which is controlled by the recording medium.

The medium and the information processing device according to this invention are the recording medium and the information processing device which are applied to the above-described information processing system.

Furthermore, the medium herein mentioned is a medium which has information (such as a game program) recorded in the first recording region thereof by way of some physical means, and which is capable of causing the information processing device such as a game device to operate a certain function such as execution of a game program. Without limitation to a game program, any medium in the form of a CD with music data or an LD with information such as animation data recorded therein may be used. In short, either a medium which downloads a program to a computer with some kind of measures, or a medium which reproduces music data or animated data will do.

Examples of the medium include a CD-R, game cartridge, floppy disk, magnetic tape, magneto-optical disc, CD-ROM, DVD-ROM, DVD-RAM, ROM cartridge, RAM memory cartridge with a battery backup, flash memory cartridge, and nonvolatile RAM cartridge.

Communication media such as a wire communication medium like a telephone line, and a radio communication medium such as micro-wave are also included. The internet is also included in the above-mentioned communication media.

The above-mentioned medium comprises a second recording region apart from the above-mentioned first recording region, and this second recording region is used as the area for storing identification information of the information processing device (a game machine, for example). In this case, the second recording region can be composed of a nonvolatile memory.

DETAILED DESCRIPTION OF PREFERRED EMBODIMENTS

Figure 1:
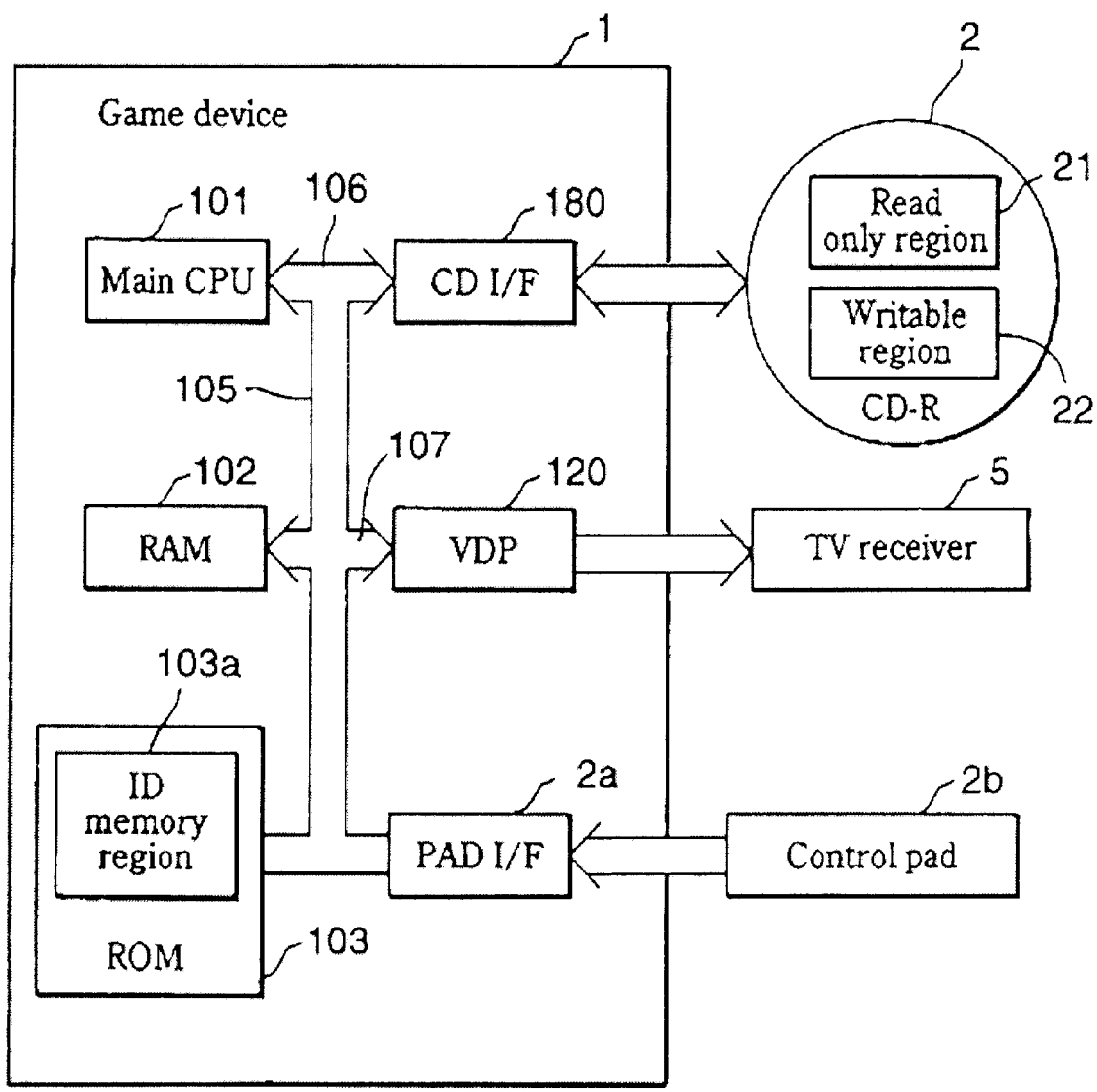
FIG. 1 is a block diagram showing the outline of a game device system according to an embodiment of this invention.

Embodiments of the present invention will be hereinafter explained with regard to the configuration and the principle of the operation, referring to FIGS. 1 through 3.
Configuration A game device system is composed of a game device 1, a telereceiver 5, a control pad 2b and a CD-R 2, as shown in FIG. 1.

This CD-R 2 is one example of an external recording medium. As other examples, a game cartridge, floppy disc, CD-ROM, DVD-ROM, DVD-RAM, magnetic tape, ROM cartridge, magneto-optical disc, RAM memory cartridge with a battery backup, flash memory cartridge, or nonvolatile RAM cartridge may be used.

The CD-R 2 comprises a read only region 21 (a first recording region) and a writable region 22 (a second recording region). A game program, for example, is stored in the read only region 21. The writable region 22 is composed of, for example, a nonvolatile memory and the like, and it can be used as an identification information storage region for storing identification information, and it can also be used as a region for saving the result of the game program, that is, as a backup memory.

This identification information may be an identification number (such as a serial number) specific to the game machine 1, or an identification code of some kind (such as a character code). It may also be a combination of a number code and a character code. Different identification information is given to a different game device.

A control pad 2b is a controller for a player to play the game and to operate characters. Game pictures are displayed on the telereceiver 5.

The game device 1 comprises a main CPU 101, a CD I/F 180, a RAM 103, a ROM 103, a VDP 120, a PAD I/F 2a. An ID memory region 103a is secured inside the ROM 103. Identification information of the game device 1 is stored in the ID memory region 103a.

The main CPU 101 is connected through an internal bus 105 to the RAM 103 and the ROM 103, and performs various control operations, arithmetic processing and the like. The main CPU 101 runs a game program stored in the CD-R 2 through the CD I/F 180 and the internal bus 106.

The CD I/F 180 herein referred to is an I/O interface of the CD-R 2. Data necessary for the execution of the game program is stored in the RAM 102.

The VDP 120 is a processor for displaying game pictures on the telereceiver 5, and is connected to the main CPU 101 through the internal bus 107. The PAD I/F 2a is an I/O interface for obtaining output data from the control pad 2b.

Figure 2:
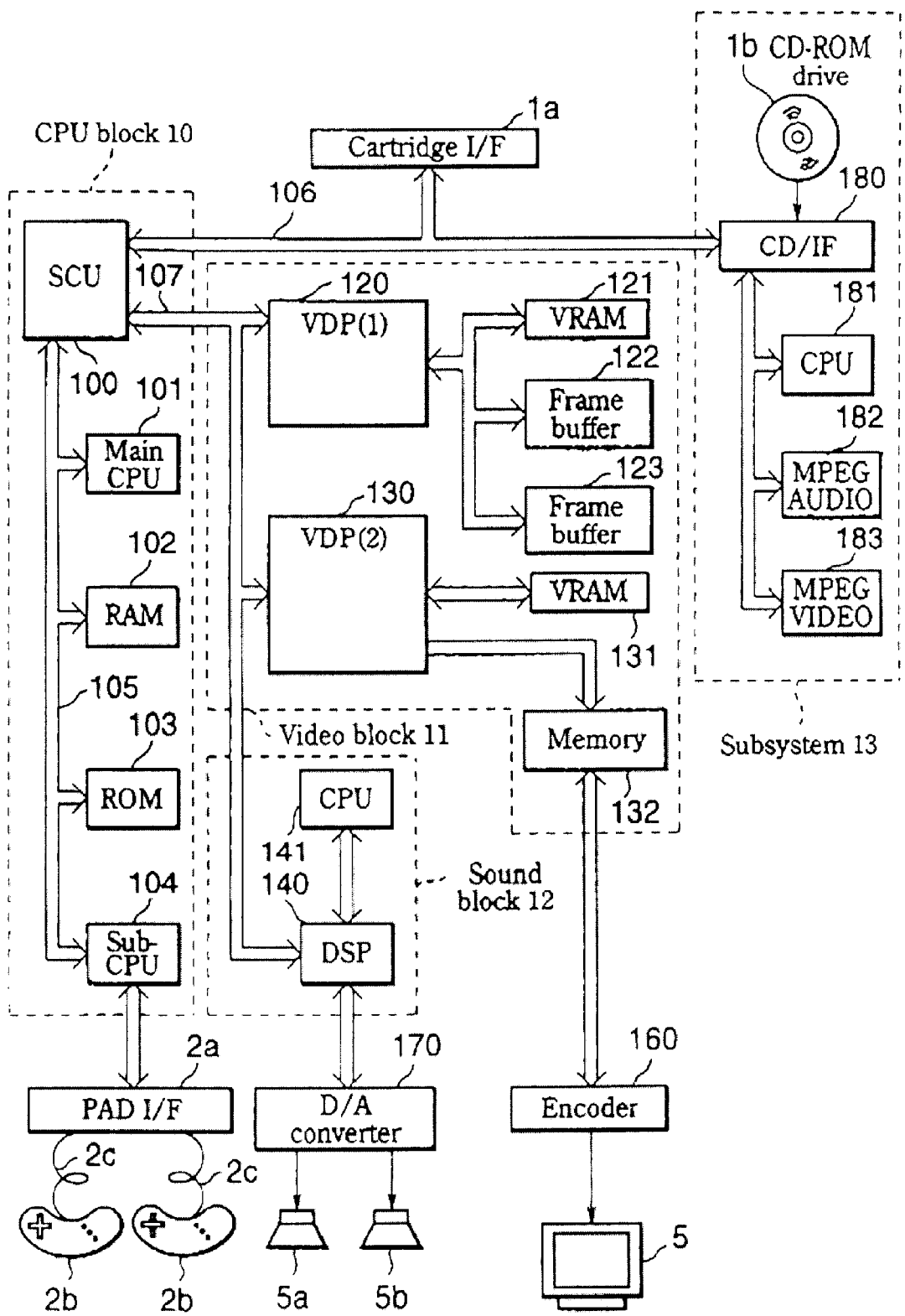
FIG. 2 is a block diagram showing the detailed structure of the game device system in FIG. 1.
Figure 3:
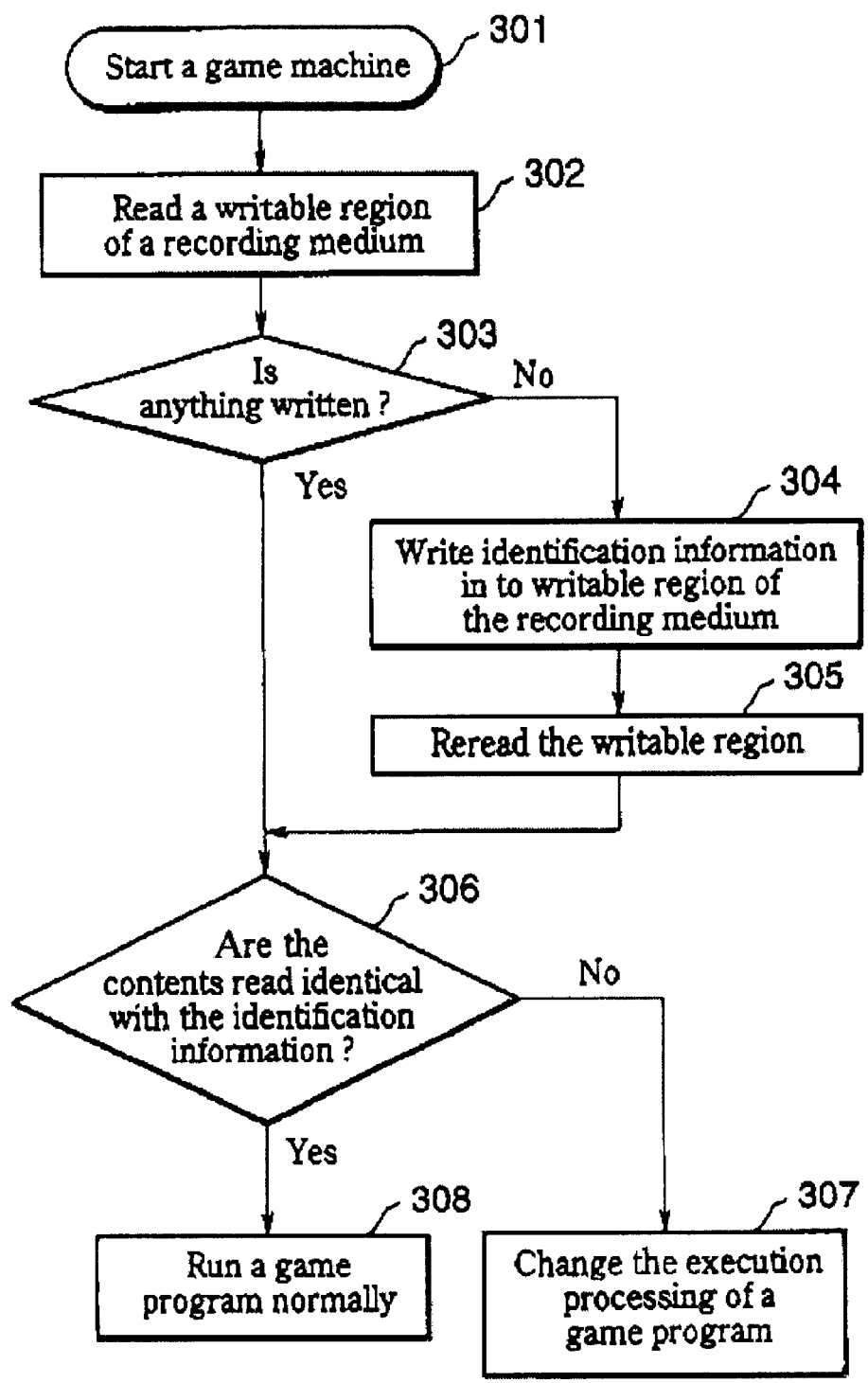
FIG. 3 is a flowchart for explaining the operation of the game device system.

Referring to FIG. 2, the schematic block in FIG. 1 will be hereinafter explained in detail. FIG. 2 is an example configuration to realize the block of FIG. 1. The game device 1 is composed of a CPU block 10 which controls the whole game device 1, a vide block 11 which controls the display of game pictures, a sound block 12 which generates sound effects and the like, a subsystem 13 which reads the CD-ROM, and the like.

The CPU block 10 is composed of an SCU (System Control Unit) 100, a main CPU 101, a RAM 102, a ROM 103, a cartridge I/F 1a, a sub-CPU 104, a CPU bus 105 and the like.

The main CPU 101 controls the whole device. This main CPU 101 has an internal operating function similar to that of a DSP (Digital Signal Processor) and is capable of running application software at high speed. ) The RAM 102 is used as a work area of the main CPU 101. The ROM 103 is divided into an ID memory region 103a explained with reference to FIG. 1 and a region where an initialization program for initialization processing and programs for performing various controls are stored.

The SCU 100 controls the buses 105, 106 and 107, thereby allowing smooth input and output of data between the main CPU 101, VDPs 120 and 130, a DSP 140, a CPU 141 and the like. The SCU 100 is provided with an internal DMA controller inside and is capable of transferring sprite data in the course of a game to a VRAM inside the video block 11. This makes it possible to run applications software of games and the like at high speed.

Control pads 2b and 2c are equipped with ABC keys and XYZ keys in addition to cross keys. The sub-CPU 104 is called an SMPC (System Manager & Peripheral Control) and has functions, for example, to collect output data of ABC keys or the like from the control pad 2b or 2c through the PAD I/F 2a when required by the main CPU 101.

Furthermore, an optional peripheral among a joy stick, a keyboard and the like, in addition to the control pad 2b, can be connected to the PAD I/F 2a. The sub-CPU 104 automatically recognizes the type of peripheral connected to the PAD I/F 2a (a terminal placed on the side of the main device) and has a function to collect peripheral data and the like by a communication method in accordance with the type of peripheral.

The video block 11 comprises a VDP (Video Display Processor) 120 which draws characters and the like composed of polygon data of a video game, and a VDP 130 which performs drawing of background pictures, synthesis of polygon picture data and the background pictures, clipping processing and the like. The VDP 120 is connected to a VRAM 131 and frame buffers 122 and 123. Drawing data of polygons representing characters of a video game device is sent from the main CPU 101 through the SCU 100 to the VDP 120, and is then written on a VRAM 121. The drawing data written on the VRAM 121 is drawn, for example, on the frame buffer 122 or 123 for drawing in a 16 bit/pixel format. Data drawn on the frame buffer 122 or 123 is sent to the VDP 130. Information for controlling the drawing is given from the main CPU 101 through the SCU 100 to the VDP 120. The VDP 120 performs the drawing processing in accordance with these instructions.

The VDP 130 is connected to the VRAM 131, and picture data outputted from the VDP 130 is caused to be outputted to an encoder 160 through a memory 132.

The encoder 160 generates vide signals by adding synchronizing signals and the like to this picture data, and outputs them to the telereceiver 5.

The sound block 12 is composed of a DSP 140 which performs sound synthesis in a PCM mode or an FM mode, and a CPU 141 which controls this DSP 140. Sound data generated by the DSP 140 is converted to 2-channel signals by a D/A converter 170, which are then output to a speaker 5b.

The subsystem 13 is composed of a CD-ROM drive 1b, a CD I/F 180, a CPU 181, MPEG AUDIO 182, MPEG VIDEO 183 and the like. This subsystem 13 has functions, for example, to read application software provided in a form of a CD-ROM and to generate animation data. The CD-ROM drive 1b is designed to read data from a CD-ROM. The CPU 181 performs processing, for example, to control the CD-ROM drive 1b and to correct errors in the data read. Data which is read from a CD-ROM is supplied through the CD I/F 180, the bus 106 and the SCU 100 to the main CPU 101, and is then utilized as application software. Also, the MPEG AUDIO 182, the MPEG VIDEO 183 are devices to restore the data compressed by MPEG (Motion Picture Expert Group) standards.

Restoration of MPEG compressed data which is written on the CD-R 2 as shown in FIG. 1 by using the MPEG AUDIO 182 and the MPEG VIDEO 183 enables the regeneration of animation data on the telereceiver 5.

Principle of Performance

The block operation shown in FIGS. 1 and 2 will be hereinafter explained, referring to the flowchart of FIG. 3.

Firstly, a player inserts the CD-R 2 into the game device 1 and starts the game device 1 (S301). When the game device 1 starts, an initialization program for the initialization processing stored in the ROM 103 is executed. The contents of the writable region 22 of the CD-R 2 are transferred through the SCU 100 to the RAM 102 (S302), so that the main CPU 101 can check whether identification information specific to the game device 1 is stored in the writable region 22 of the CD-R 2. Upon shipment of the CD-R 2, the identification information is not written in the writable region 22. Accordingly, the main CPU 101 determines whether any identification information is written in the writable region 22 or not (S303), and if the identification information is written, it compares the identification information of its own with the identification information of the medium (S306).

If it is determined that no identification information of the game machine 1 is written in the writable region 22 (if the answer is "No" in S303), the identification information stored in the ID memory region 103a will be written in the writable region 22 (S304).

The identification information may be the date and time when the main CPU 101 recognized that the CD-R 2 was initially applied to the game device 1, for example. Also, the identification information can be decided by random numbers.

Subsequently, the contents of the writable region 22 are reread (S305), and then the processing proceeds to S306.

On the other hand, if it is determined that the identification information is written in the writable region 22 (if the answer is "YES" in S303), then the processing proceeds to S306.

In S306, the identification information written in the writable region 22 is compared with the identification information stored in the ID memory region 103a. If the comparison result shows that both identification information are the same, the main CPU 101 determines the CD-R 2 as a "a medium which has not been used by another information processing device" and runs the game program as usual (S308).

On the other hand, if the former identification information is not identical to the latter, the main CPU 101 determines that the CD-R 2 "has already been used by another information processing device", the changes the contents of the processing to execute the game program (S307).

Possible changes to the processing to execute the game program in S307 are as follows:

For example, the CD-R 2 can tell the user that the CD-R 2 "has already been used by another information processing device" by displaying a message indicating that the CD-R 2 "has already been used by another information processing device" on the telereceiver 5.

In this case, it is possible to alter the contents of the processing of the game program, or change parts of the scenario of the game program, shorten the play time of the game, or reduce the number of stages of the game. Moreover, saving the results of the game in the writable region 22 can be prohibited. Also, the speed of the operation processing of the main CPU and the like can be made slower on purpose. For example, the processing to lower a clock frequency is possible.

Also, according to a direction of the main CPU 101, the sub-CPU 104 is capable of limiting or stopping the acquisition of a part of peripheral data received from the control pad 2b and the like, and partially limiting or stopping the acceptance of the control pad 2b and the like from a user.

The above-described processing can give variety to the contents of execution and processing of a game program in the game machine.

Moreover, by limiting the operation of the VDP 120 and the VDP 130, it is possible to partially limit the display of the image of the game screen. Also, sound output from the speakers 5a and 5b can be partially limited by limiting the operation of the CPU 141 and the DSP 140 which compose the sound block 12.

As for the contents of the processing in S307, other than partially limiting the execution of the game program, the main CPU 101 can stop the execution of the game program by stopping the access to the game program stored in the read only region 21 of the game cartridge 2. The telereceiver 5 can also display a game as a demonstration version.

Also, is possible to cancel the processing in S305, and reread the identification information written in the recording medium (CD-R 2) in S304, and then perform specified processing by determining this recording medium as unused in any game device. An example of such processing is to display a message on the telereceiver 5 to the effect that this recording medium is used with a game device for the first time, and to run the game program normally. Accordingly, this invention makes it possible not only to determine whether the recording medium has been used by any information processing device, but also to change the operating environment of the program stored in the recording medium if it has already been used by any information processing device.

In S306, if the identification information is completely identical, it is judged a "YES". Otherwise, it is judged as "NO". However, even if it is "NO" in S306, it is possible to make further identification by determining whether the identification information is partially identical or not. For example, although it is not shown in the flow chart in FIG. 3, if a specific region of the identification information is searched and it is found that the information of the specific region is identical, the contents of the game program processing can be changed accordingly. For example, if the identification region is divided into N number of blocks $A_1$, $A_2$, through $A_N$, and if only the information of the region belonging to the block $A_N$ is identical, the number of stages in the game scenario is reduced, and if only the information of the region belonging to the block $A_{N-1}$ is identical, the degree of difficulty of the game is changed. Otherwise the game program will be caused to run normally.

Moreover, it is possible to give a special meaning to the information in the specific region of the identification information and to change the contents of the game program processing on the basis of agreement or disagreement of the information in the specific region. For example, in the case where the information in the specific region is "1", even if all the information in other regions is not identical, the game program will be caused to run normally. For example, in the case of a specific CD-R 2 which can be used regardless of the type of the game device 1, it is necessary to make the execution of the game program possible even if the identification information of the game machine 1 is not identical with the identification information of the CD-R 2. Consequently, if the CD-R 2 is the specific recording medium as described above, it is possible to set the information in the specific region of the identification information as "1" and to perform the above-described processing.

As described above, this invention makes it possible to provide a system designed to give variety to informational processing operational environment by comparing identification information of the recording medium with identification information of the information processing device and by changing the operational environment of the program stored in the recording medium or the contents of the execution processing.

Moreover, in the case where the medium is, for example, a CD, LD or the like which records sound data or animation data, it is possible to give changes to the operational environment thereof, that is, the time of reproducing music and the like. This can be done by limiting the operation of the CD I/F 180, thereby setting a limitation on the acquisition of sound data or animation data by the CPU 181.

What is claimed is:

1. An information processing system comprising:
a recording medium including a first recording region and a second recording region; and
an information processing device for either regenerating data recorded in the first recording region of said recording medium or executing a program recorded in the first recording region of said recording medium, said information processing device comprising recording means for recording its specific information comprising symbol arrays having one or more sections in the second recording region of said recording medium;
wherein said information processing device further comprises:
comparing means for comparing specific information recorded from said recording means with specific information in the second recording region; and
processing means which, when the result of the comparison shows that the specific information of the information processing device and the specific information of the recording medium are not completely identical but partially identical in one or more of the sections thereof, modifies the operation of regenerating data of said recording medium or the operation of executing a program in said recording medium under desired conditions corresponding to said identical portions of said symbol arrays.

2. An information processing system comprising:
a recording medium including a first recording region and a second recording region; and
an information processing device for either regenerating data recorded in the first recording region of said recording medium or executing a program recorded in the first recording region of said recording medium, said information processing device comprising recording means for recording its specific information in the second recording region of said recording medium;
wherein said information processing device further comprises:
comparing means for comparing specific information recorded from said recording means with specific information in the second recording region; and
processing means for partially restricting the operation of regenerating data of said recording medium or the operation of executing a program in said recording medium, by differentiating between the operational condition of a recording medium which is used only for a specified information processing device and the operational condition of a recording medium which was used by another information processing device, if the result of the comparison shows that the specific information recorded from said recording means is not identical with the specific information in the second recording region.

3. An information processing system according to claim 2, further comprising means for displaying that said recording medium has been used by another information processing device if the result of the comparison made by the comparing means shows that the specific information recorded in the second recording region of said recording medium is not identical with the specific information of the information processing device.

4. An information processing system according to claim 2, wherein said recording medium is a medium with a game program stored therein, and said information processing device is a game machine for executing a game on a game screen.

5. An information processing system according to claim 4, wherein said processing means varies the operation of game processing which is developed by said recording medium.

6. An information processing system according to claim 4, further comprising means for partially changing a scenario of the game program if the result of the comparison made by the comparing means shows that the specific information recorded in the second recording region of said recording medium is not identical with the specific information of the information processing device.

7. An information processing system according to claim 4, further comprising means for reducing a time for playing the game if the result of the comparison made by the comparing means shows that the specific information recorded in the second recording region of said recording medium is not identical with the specific information of the information processing device.

8. An information processing system according to claim 4, further comprising means for decreasing a number of stages of the game if the result of the comparison made by the comparing means shows that the specific information recorded in the second recording region of said recording medium is not identical with the specific information of the information processing device.

9. An information processing system according to claim 4 further comprising means for forbidding a result of the game from being saved if the result of the comparison made by the comparing means shows that the specific information recorded in the second recording region of said recording medium is not identical with the specific information of the information processing device.

10. An information processing system according to claim 4 further comprising means for decreasing an operational speed of the information processing device if the result of the comparison made by the comparing means shows that the specific information recorded in the second recording region of said recording medium is not identical with the specific information of the information processing device.

11. An information processing system according to claim 4, further comprising means for limiting or stopping acquisition of a portion of peripheral data if the result the comparison made by the comparing means show the specific information recorded in the second recording region of said recording medium is not identical with the specific information of the information processing device.

12. An information processing system according to claim 4, further comprising means for partially limiting a display of the game screen or a sound output of the game screen if the result of the comparison made by the comparing means shows that the specific information recorded in the second recording region of said recording medium is not identical with the specific information of the information processing device.

13. A recording medium according to claim 2.

14. An information processing device according to claim 2.

15. A recording medium according to claim 2, wherein said recording medium is a disc medium and the second recording region is defined by a nonvolatile memory.

16. An information processing device, comprising:
means for reading information recorded in a disc medium, the disc medium including a first recording region in which data used for regeneration processing of the information processing device or a program for making the information processing device execute a desired processing is stored, and a second recording region which is writable and is composed of a nonvolatile memory;
recording means for recording identification information of the information processing device on said second recording region when said second recording region of said disc medium does not have any identification information of the information processing device recorded therein;
comparing means for comparing the identification information of the information processing device with the identification information recorded in said second recording region when it is judged that at least one of the identification information of the information processing device and the identification information recorded in said second recording region is recorded on said second recording region; and
processing means for partially restricting the operation of regenerating data recorded on the first recording region of the disc medium or the operation of executing a program recorded on the first recording region by differentiating between the operational condition of a disc medium which is used only for a specified processing device and the operational condition of a recording medium which was used by another information processing device, when the result of the comparison shows that the identification information of the information processing device is not identical with the specific information recorded in the second recording region.

17. An information processing method, comprising:
a step of reading information recorded in a disc medium, the disc medium including a first recording region in which data used for regeneration processing of the information processing device or a program for making the information processing device execute a desired processing is stored, and a second recording region which is writable and is composed of a nonvolatile memory;
a step of recording identification information of the information processing device in the second recording region when said second recording region of said disc medium does not have any identification information of the information processing device recorded therein;
a step of comparing the identification information of the information processing device with the identification information recorded in said second recording region when it is judged that at least one of the identification information of the information processing device and the identification information recorded on said second recording region is recorded in the said second recording region; and
a step of partially restricting the operation of regenerating data recorded on the first recording region of the disc medium or the operation of executing a program recorded on the first recording region by differentiating between the operational condition of a disc medium which is used only for a specified processing device and the operational condition of a recording medium which was used by another information processing device, when the result of the comparison shows that the identification information of the information processing device is not identical with the specific information recorded on the second recording region.

18. An information processing system comprising:
a recording medium including a first recording region with a game program stored therein and a second recording region; and
a game machine for either regenerating data recorded in the first recording region of said recording medium or executing a game program recorded in the first recording region of said recording medium, said game machine comprising recording means for recording specific information comprising symbol arrays having one or more sections in the second recording region of said recording medium;
wherein said game machine further comprises:
comparing means with specific information recorded from said recording means with specific information in the second recording region; and
processing means which, when the result of the comparison shows that the specific information of the game machine and the specific information of the recording medium are not completely identical but partially iden tical in one or more of the sections thereof, modifies the operation of regenerating data of said recording medium or the operation of executing a game program in said recording medium under desired conditions corresponding to said identical portions of said symbol arrays.

19. An information processing system comprising:

a recording medium including a first recording region with a game program stored therein and a second recording region; and a game machine for either regenerating data recorded in the first recording region of said recording medium or executing a game program recorded in the first recording region of said recording medium, said game machine comprising recording means for recording specific information comprising symbol arrays having one or more sections in the second recording region of said recording medium;

wherein said game machine further comprises:

comparing means with specific information recorded from said recording means with specific information in the second recording region; and processing means which, when the result of the comparison shows that the specific information of the game machine and the specific information of the recording medium are not completely identical but partially identical in one or more of the sections thereof, modifies the operation of regenerating data of said recording medium or the operation of processing a game, the process of which is controlled by said recording medium under desired conditions corresponding to said identical portions of said symbol arrays.

* * * * *